United States Patent
Cavallo et al.

(10) Patent No.: US 6,338,705 B1
(45) Date of Patent: Jan. 15, 2002

(54) APPARATUS FOR MACHINING CALIPER BLOCKS AND BRACKETS OF MOTORCAR DISK BRAKES

(75) Inventors: Giorgio Cavallo, Borgaro Torinese; Marco Martinis, Turin, both of (IT)

(73) Assignee: Vigel S.p.A., Borgaro Torinese (IT)

( * ) Notice: Subject to any disclaimer, the term of this patent is extended or adjusted under 35 U.S.C. 154(b) by 0 days.

(21) Appl. No.: 09/715,153

(22) Filed: Nov. 20, 2000

(30) Foreign Application Priority Data

Feb. 4, 2000 (EP) .......................................... 00 830080

(51) Int. Cl.[7] .......................... B23Q 3/157; B23C 1/04; B23B 39/02
(52) U.S. Cl. ............................. 483/14; 29/26 A; 29/53; 408/31; 408/42; 409/203; 409/213; 409/217; 483/56
(58) Field of Search ............................... 483/13, 1, 14, 483/15, 32, 54–56; 29/55, 27 C, 27 R, 33 P, 40, 50, 53; 409/217, 213, 203, 219, 172; 408/42, 35, 44, 50, 31, 46

(56) References Cited

U.S. PATENT DOCUMENTS

| | | | |
|---|---|---|---|
| 3,979,819 A | * | 9/1976 | Nomura et al. ........... 408/35 X |
| 4,125,932 A | * | 11/1978 | Kielma et al. ............... 29/26 A |
| 4,354,306 A | * | 10/1982 | Ida et al. ....................... 483/32 |
| 4,404,729 A | * | 9/1983 | Jensen et al. ................... 483/32 |
| 5,442,843 A | * | 8/1995 | Fessler ........................ 29/26 A |
| 5,542,899 A | * | 8/1996 | Yamada et al. ............ 483/51 X |
| 6,203,478 B1 | * | 3/2001 | Gorrochategui ........... 408/46 X |

FOREIGN PATENT DOCUMENTS

| | | | | |
|---|---|---|---|---|
| CH | 654237 | * | 2/1986 | ................... 483/15 |
| DE | 3519706 | * | 12/1986 | ................... 483/32 |
| GB | 2167325 | * | 5/1986 | ................... 483/15 |
| JP | 61-257727 | * | 11/1986 | ................... 483/32 |
| JP | 64-51213 | * | 2/1989 | ................... 483/32 |
| JP | 3-184708 | * | 8/1991 | ................... 409/217 |
| SU | 1505747 | * | 9/1989 | ................... 483/32 |

* cited by examiner

Primary Examiner—William Briggs
(74) Attorney, Agent, or Firm—Guido Modiano; Albert Josif; Daniel O'Byrne

(57) ABSTRACT

A machining head (36) is drivable along a vertical axis and two horizontal axes with respect to a workpiece held on a workpiece-holding device, and has, at progressively lower levels along said vertical axis, one or two high-speed spindles (44), one or two low-speed spindles (46) and one or two feed-out spindles (48), all arranged at right angles to said vertical axis and driven by one or more motors (42) mounted on the head. The machining head can bring the high-speed spindles to cooperate with a tool-changing magazine (52). The workpiece-holding device (54; 154) is adapted to carry two sets of workpieces on respective supports (56, 58; 170), and to shift said supports in succession between a working position near the head and a tool-changing position remote from the head.

19 Claims, 8 Drawing Sheets

APPARATUS FOR MACHINING CALIPER BLOCKS AND BRACKETS OF MOTORCAR DISK BRAKES

BACKGROUND OF THE INVENTION

This invention is concerned with an apparatus for machining caliper blocks and brackets of motorcar disk brakes.

As well known in the art, production of disk brake caliper blocks and brackets starts from a blank generally consisting of a workpiece cast in iron or aluminum, which undergoes a set of machining steps comprising milling, facing, boring, drilling and tapping, which operations may be made along different axes.

An approach that is often adopted nowadays in the mass production of caliper blocks and brackets is to set up a highly automated machining line, which is typically capable of a cycle time of about 20 sec/cycle, giving rise to a production of the order of a few thousands pieces/day (i.e., a few hundreds of pieces/hour). The drawback of such approach is the high rigidity of the dedicated line, which makes the line obsolete as soon as the production is changed. If such a change takes place prematurely with respect to the initial forecast, e.g. where a motorcar model has not been successful, this may cause a serious economic damage, since not always the line can be equipped for another production, and the investment in the equipment is then lost.

A highly flexible approach is, on the other hand, to perform machining in a machining center. This, however, requires a few minutes for one work cycle, and consequently this approach is economically viable only where the production required is less than 20 pieces/hour, as in the case of caliper blocks and brackets for lorries, or for deluxe cars.

When the production required is of the order of 50 to 100 pieces/hour, or when the lifetime of a model is uncertain, neither of the above approaches is clearly satisfactory, in the former case, because the risk that the investment in the equipment is not recovered is high, in the latter case, because the cost of the part turns out to be excessively high.

The main object of this invention is now to provide an apparatus for machining motorcar disk brake caliper blocks and brackets which provides a production that is definitely higher than a machining center, while being capable of being re-equipped in case of a production change.

SUMMARY OF THE INVENTION

The invention achieves the above and other objects and advantages, such as will appear from the following disclosure, with an apparatus for machining motorcar disk brake caliper blocks and brackets, having the feutures set out in claim 1.

The dependent claims define other advantageous features of the invention.

BRIEF DESCRIPTION OF THE DRAWINGS

The invention will now be described with reference to a few preferred embodiments, disclosed in the following disclosure and shown by way of non-limiting example, in the attached drawings, wherein.

DESCRIPTION OF PREFERRED EMBODIMENTS

Figure 1:
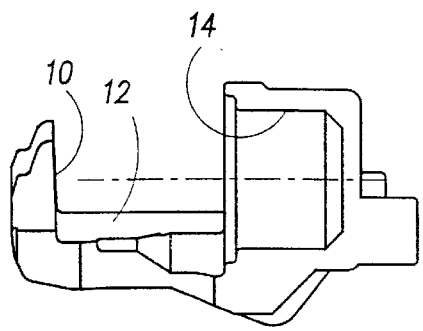
FIGS. 1, 2 are 3 are, respectively, a lateral view, a front view and a rear view, partly in cross-section, of an example of a brake caliper block, which is intended to be machined with the apparatus of the invention.
Figure 2:
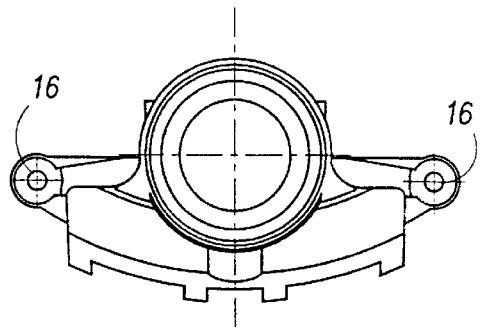
Figure 3:
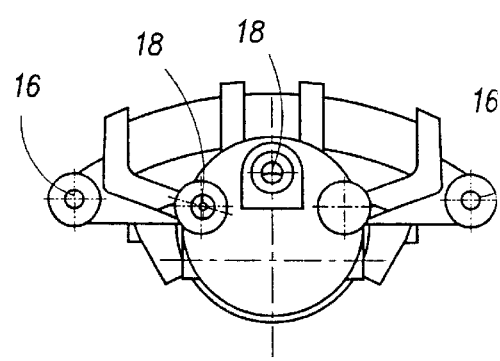

FIGS. 1, 2 and 3 show a typical caliper block of a disk brake, as known to those skilled in the art, which it is intended to machine by the apparatus of the invention. The brake caliper block typically requires facing in 10, large-gauge milling in 12, boring and profiling in a cylindrical chamber 14, drilling and/or tapping, as well as milling and spot-facing, in 16, 18, and other that may change in different cases. The special function of the part generally requires that, for instance, the axes of facing in 10 and of milling in 12 sometimes form a small angle, and it often turns out that the axes of holes 18 are not parallel to each other and/or to the axis of the chamber. Similar operations and like peculiarities are also found in the brake bracket, which is not shown here for simplicity.

Figure 6:
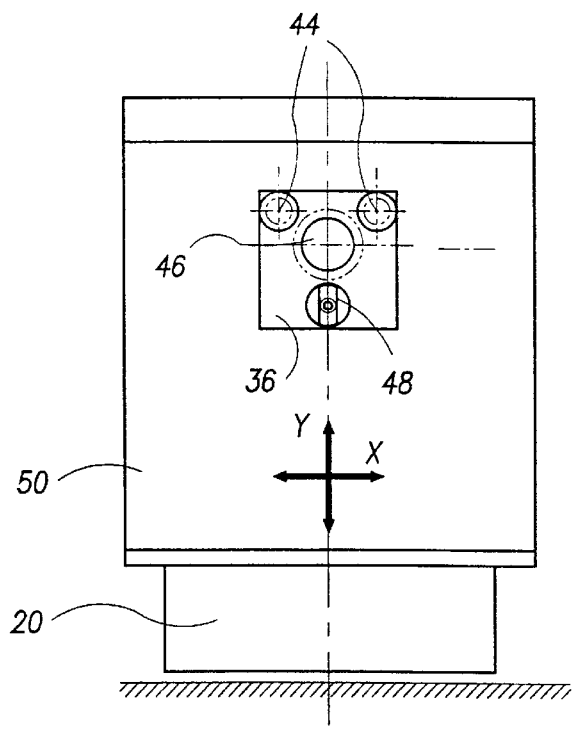
FIG. 6 is a view in front elevation of the apparatus of FIG. 4.
Figure 4:
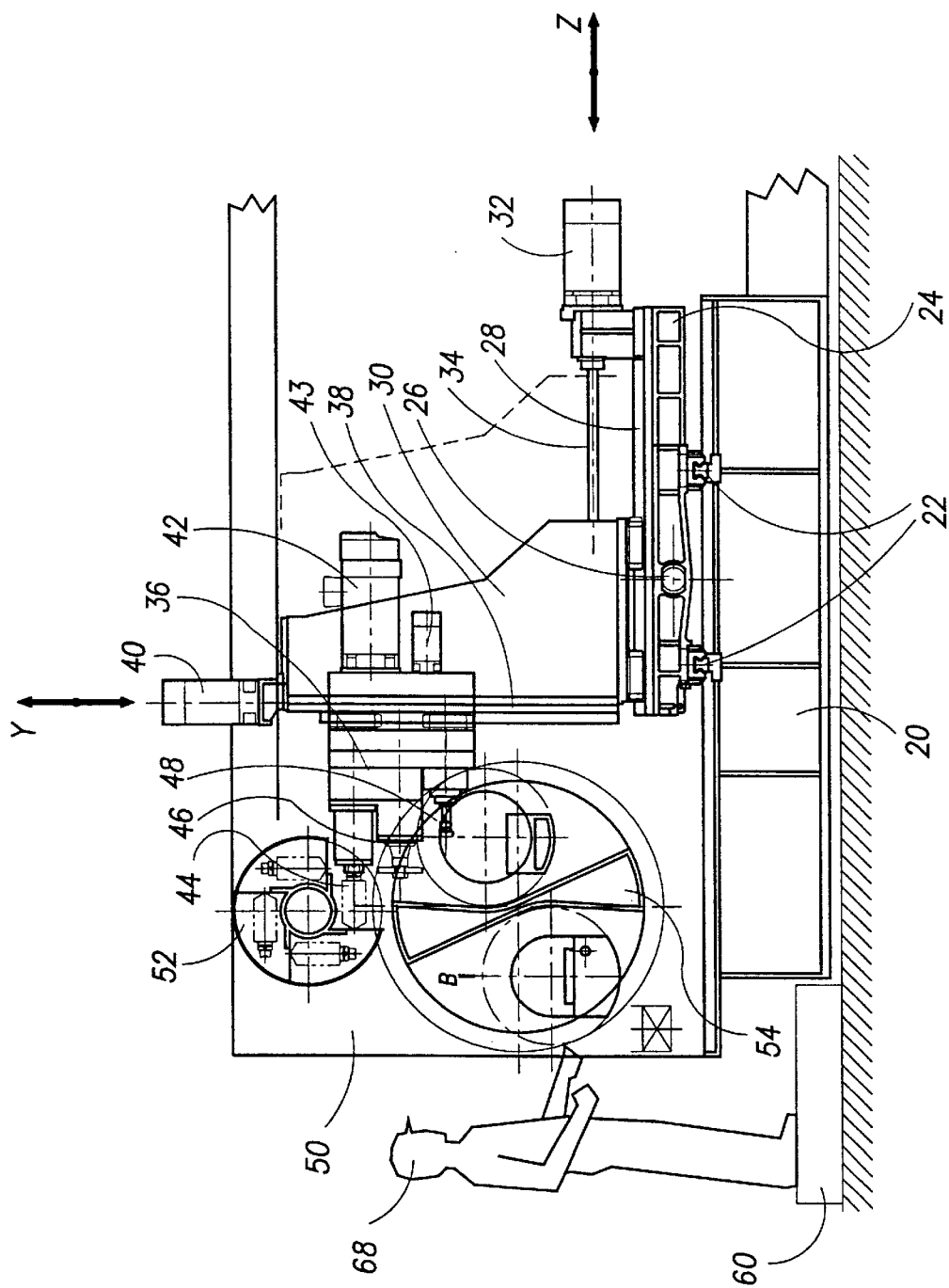
FIG. 4 is a view in side elevation of a first preferred embodiment of the apparatus of the invention.
Figure 5:
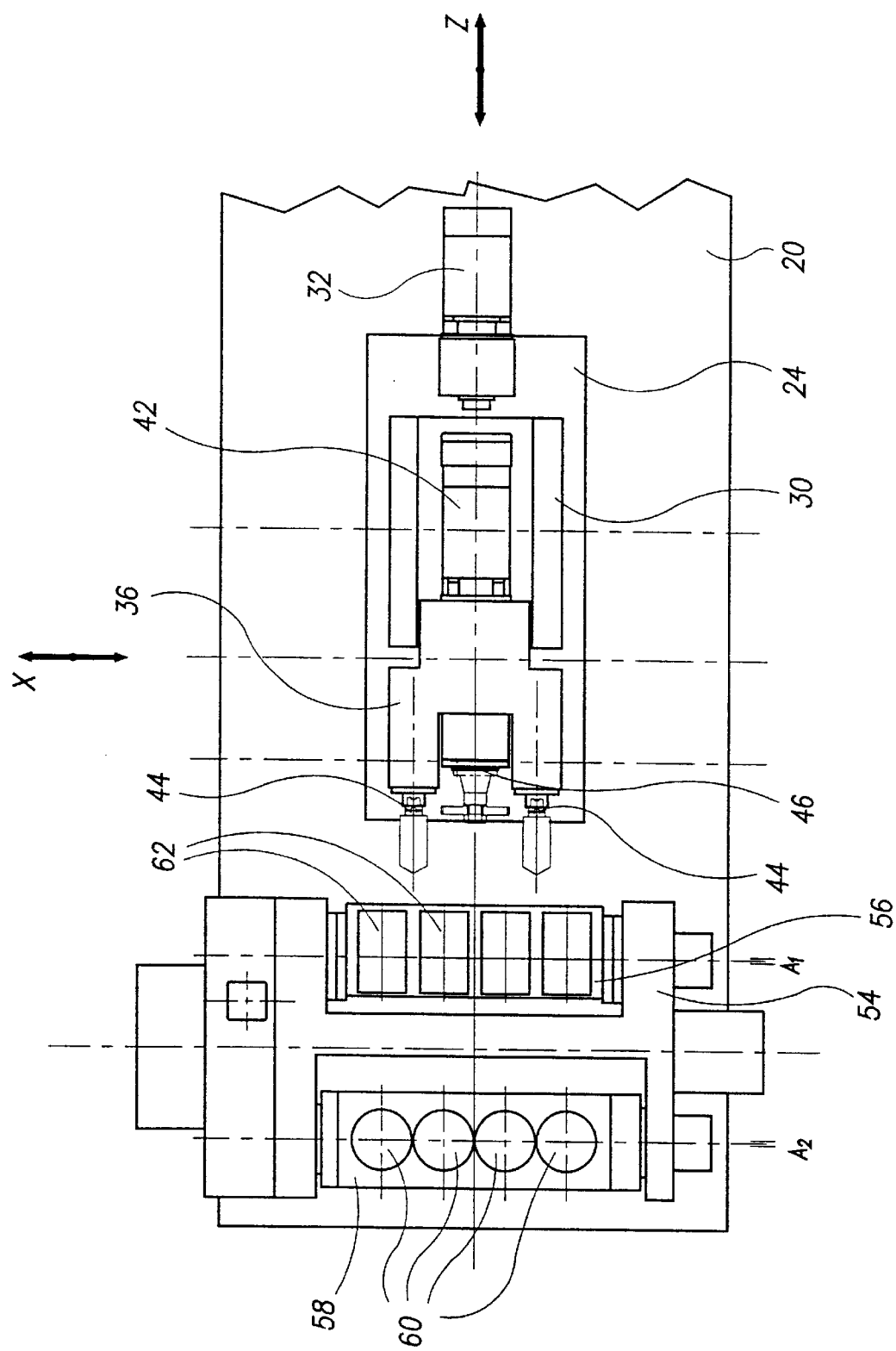
FIG. 5 is a plan view of the apparatus of FIG. 4.

With reference to FIGS. 4, 5 and 6, a bedplate 20 bears horizontal roller guides 22, which slidably support a truck 24. The truck is drivable along a horizontal axis of motion X by motor means not shown, through a ball screw 26. Truck 24 is also provided with horizontal guides 28, crossing guides 22. Guides 28 also slidably support a column 30, which is driven by motor means 32 for moving along a horizontal axis Z, also by means of a screw 34. Finally, column 30 slidably supports a machining head 36 on vertical guides 38 (axis Y). Machining head 36 is moved by motor means 40, carried by column 30 by means of a ball screw not shown, and is further provided with an electric motor 42 for driving tool-holding spindles 44, 46, 48, further described below, as well as with an electric motor 43 for controlling the feed-out of one of the spindles, also as disclosed below.

Figure 7:
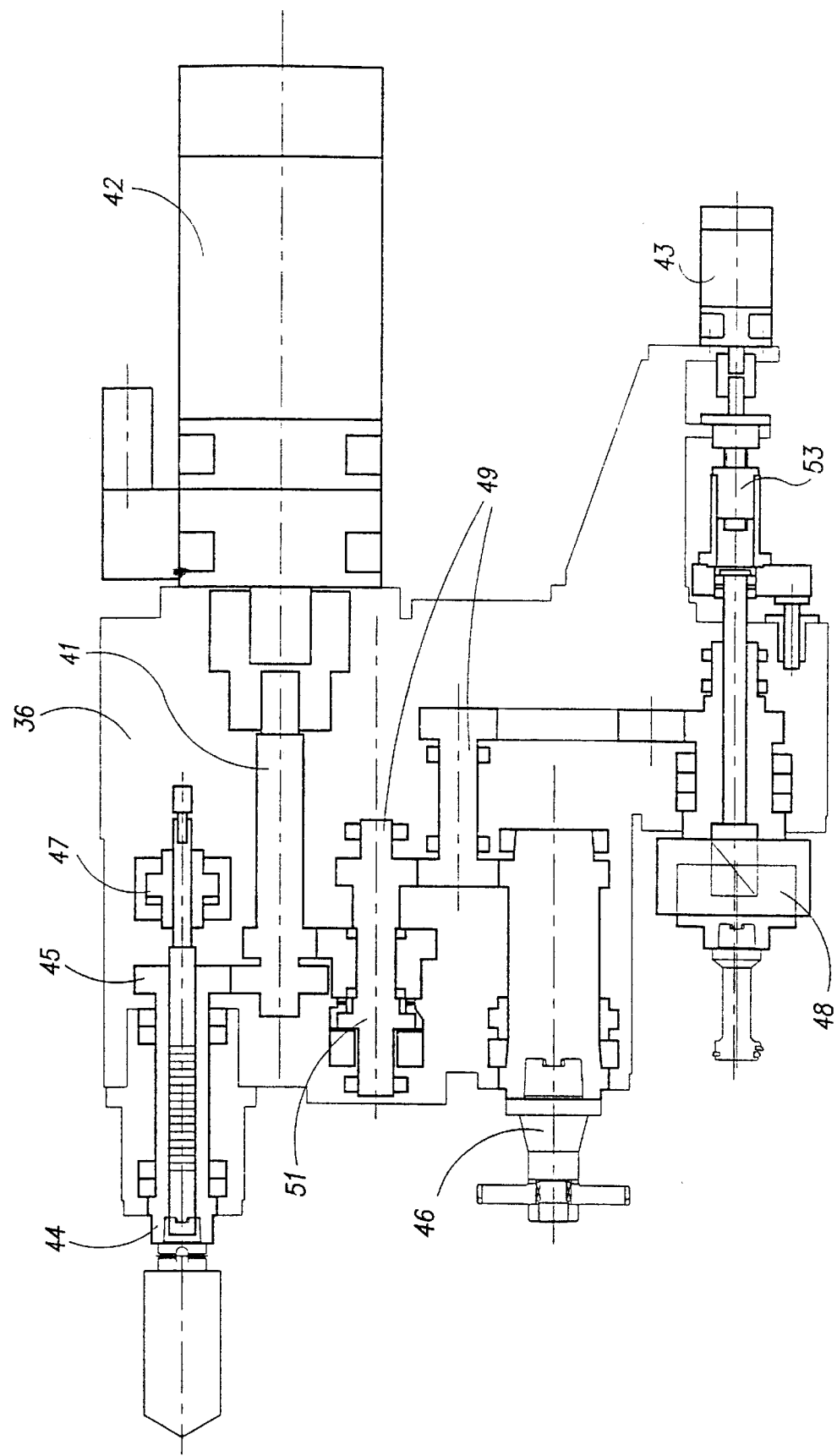
FIG. 7 is a view in transverse cross-section, on an enlarged scale, of a machining head belonging to the apparatus of FIGS. 4 to 6.

Having now reference to FIG. 7, the two upper spindles 44 of machining head 36 derive their motion, via a gearing 45, from a shaft 41 that is driven by a driving motor 42, with an appropriate driving ratio, so that a high speed (e.g. 4500 rev/min) is imparted to spindles 44. Hydraulic actuators 47 lock and unlock spindles 44 when changing the tool, as further explained below. High-speed spindles 44 are intended mainly for drilling, tapping, milling or spot-facing and the like, on small areas of a workpiece, also as will best appear below.

A further gearing 49, provided with a clutch 51, is also dependent from motor shaft 41. Gearing 49 drives a spindle 46, which is in a lower and more backward position, with a gear ratio such that will provide a low speed (e.g. 500 rev/min). Spindle 46 is of a size and geometry that will carry a large-size, for large-diameter milling.

Finally, spindle 48 is also driven through a gearing 49. This spindle is provided with a tool feed-out capability, and, accordingly, it is provided with a mechanism 53 for feeding out the tool, as known in the art, under control of electric motor 43. Spindle 48 is especially intended for outside and inside profiling (say, for milling grooves within the cylinder of the caliper), as will also be explained below in more detail.

With further reference to FIGS. 4 to 6, a frame 50 rising from bedplate 20 carries a mechanized tool-changing magazine 52 (only visible on FIG. 4), known per se, for instance of the type using a drum (although it could be of another kind, such as using a chain, a plurality of arms, etc.), and capable of bringing different tools in an appropriate position for selective grasping by spindles 44 of machining head 36.

Figure 8:
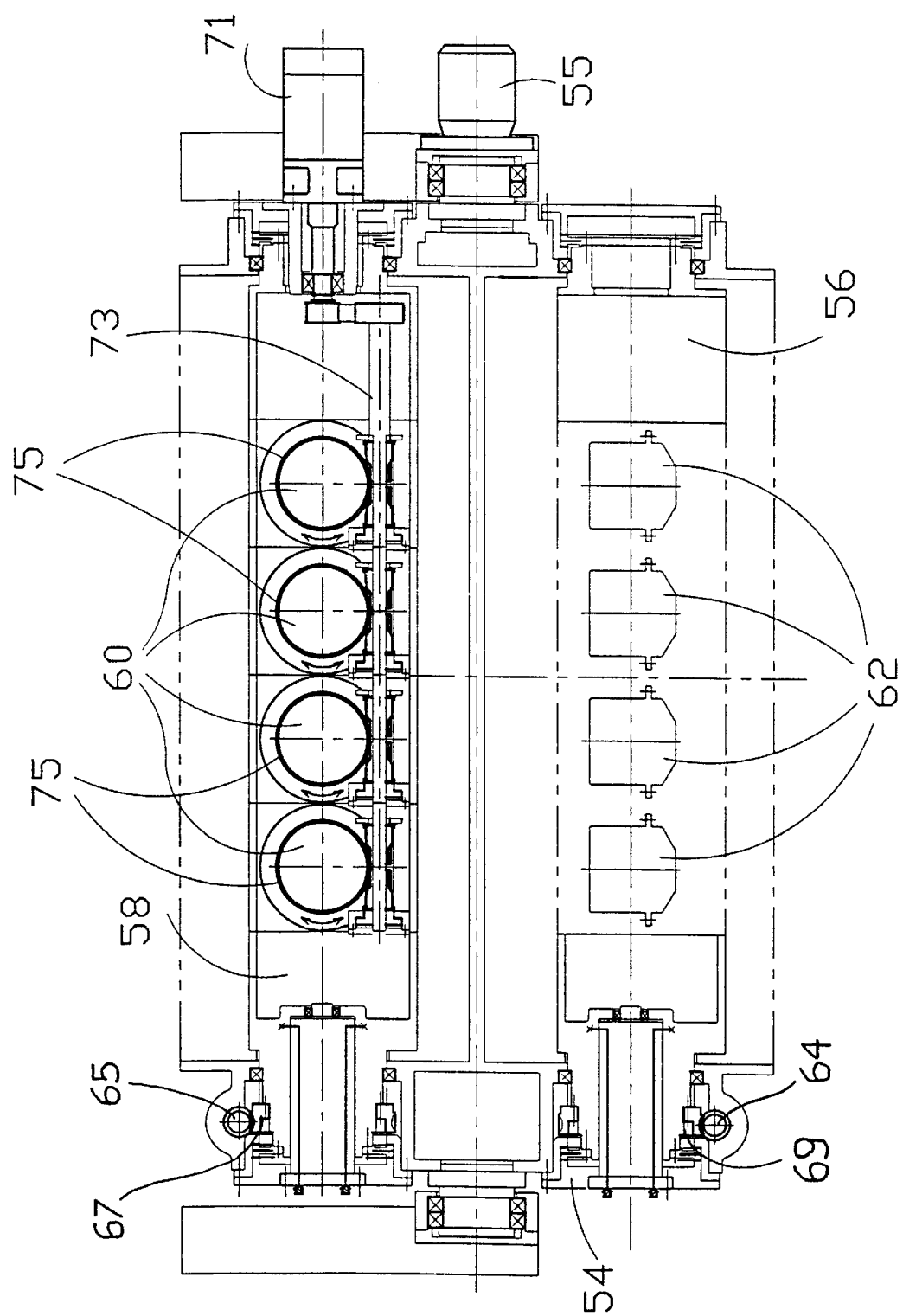
FIG. 8 is a plan view of a swapping device for workpiece-holding supports, which is a part of the apparatus of FIGS. 4 to 6.
Figure 9:
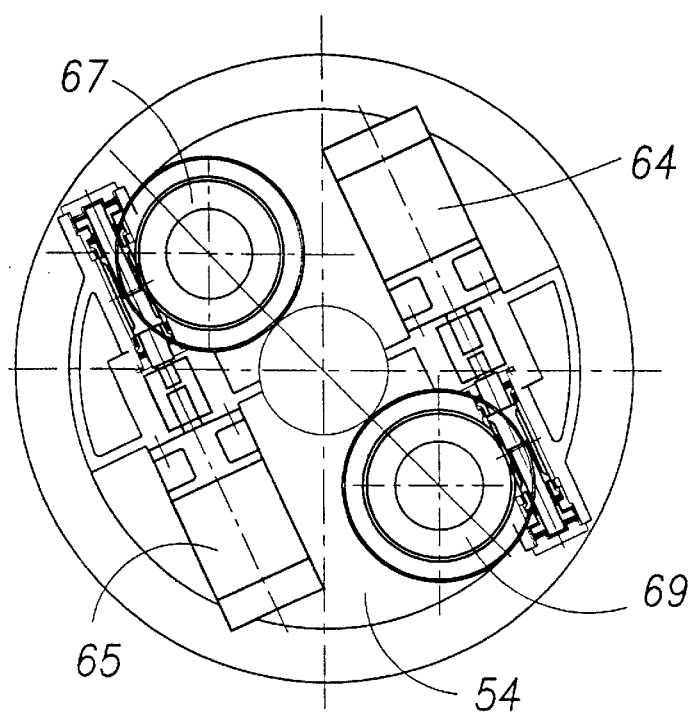
FIG. 9 is a view in transverse cross-section of the swapping device of FIG. 8.

Finally, bedplate 20 supports a workpiece-holding support swapping device 54, placed in front of machining head 36. Device 54, shown in more detail on FIGS. 8 and 9, is a drum rotating around a horizontal axis that is parallel to axis x, and provided with hydraulic motor means 55, capable of driving the drum through tipping strokes between the position shown in the drawing and a position that is tipped by 180° around its axis.

Drum 54 has two opposite bays, accommodating respective workpiece-holding supports in form of cradles 56, 58, which are rotatable around respective axes A1, A2, parallel to the tipping axis of the swapping device, and acting as supports for respective sets of four workpieces 60, 62, which are aligned parallelly to axis X. Two electric motors 64, 65, are mounted on swapping device 54 and drive, through respective worm screws, worm gears 67, 69, which are integral with their respective cradles 56, 58. Means are provided for taking up slacks and for locking during stops, as known in the art, and not shown here for simplicity.

Finally, cradle 58 carries an electric motor 71, which drives a worm screw 73 engaging worm gears 75. Worm gears 75 are integral with respective retaining members for respective workpieces, so that the workpieces can be rotated around respective axes B, at right angles to the cradle axis. Means may be provided, also in this case, for taking up slacks and for locking during stops, not shown here because they are known in the art.

All the motor means of the apparatus are obviously capable of being controlled by numeric control, and particularly, the the motors of the spindles can be controlled both as to speed and as to stop position, according to techniques that are known in the art of automated machining.

Figure 10:
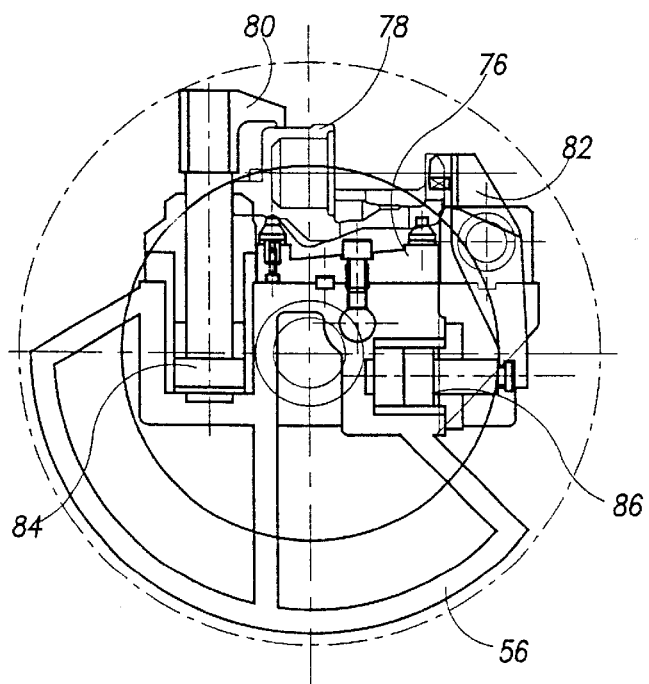
FIG. 10 is a partially driagrammatical view, in vertical cross-section and on a further enlarged scale, of a tipping cradle having a workpiece-retaining member, belonging to the apparatus of FIGS. 8 and 9.
Figure 11:
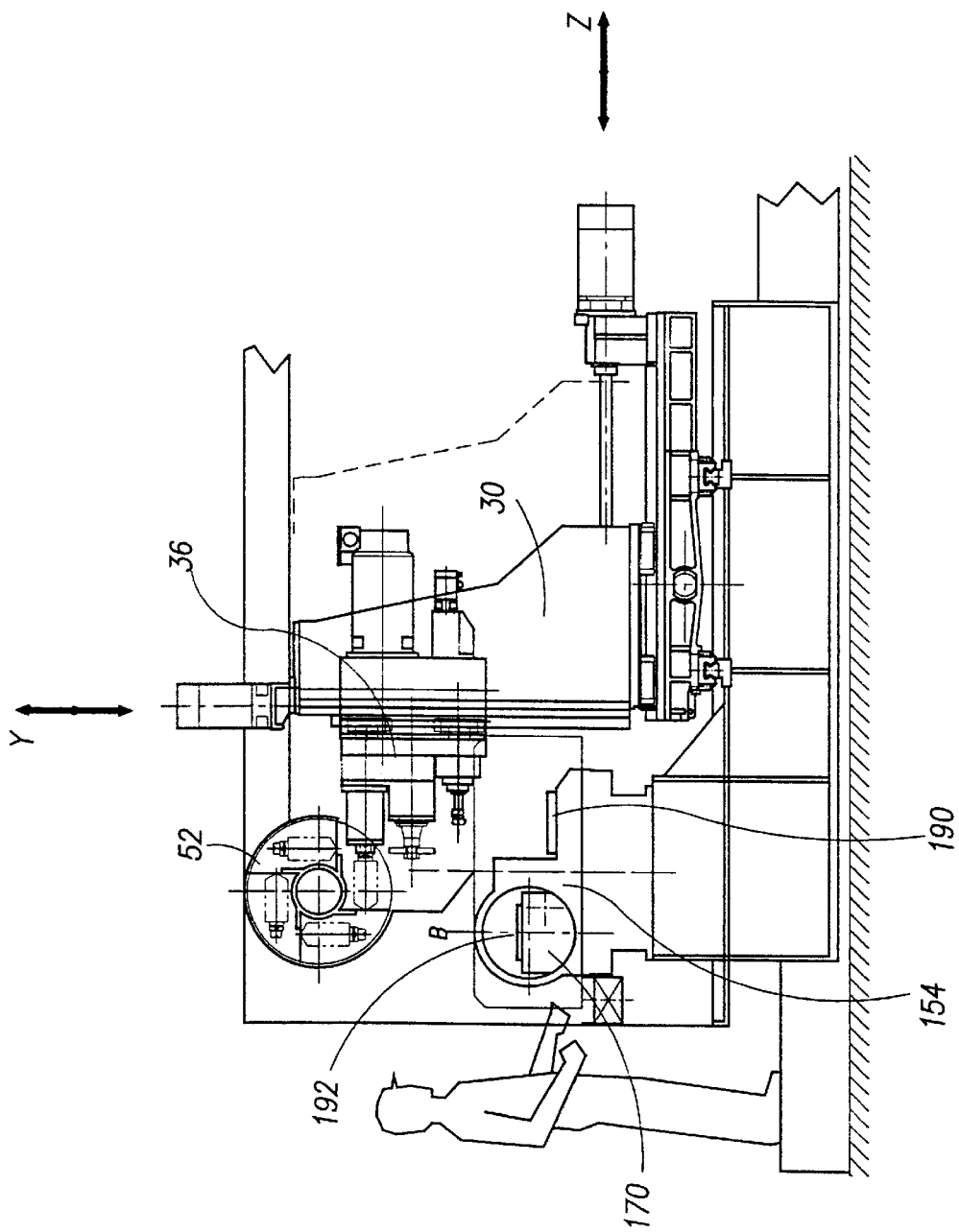
FIG. 11 is a view in side elevation of a second preferred embodiment of the apparatus of the invention.
Figure 12:
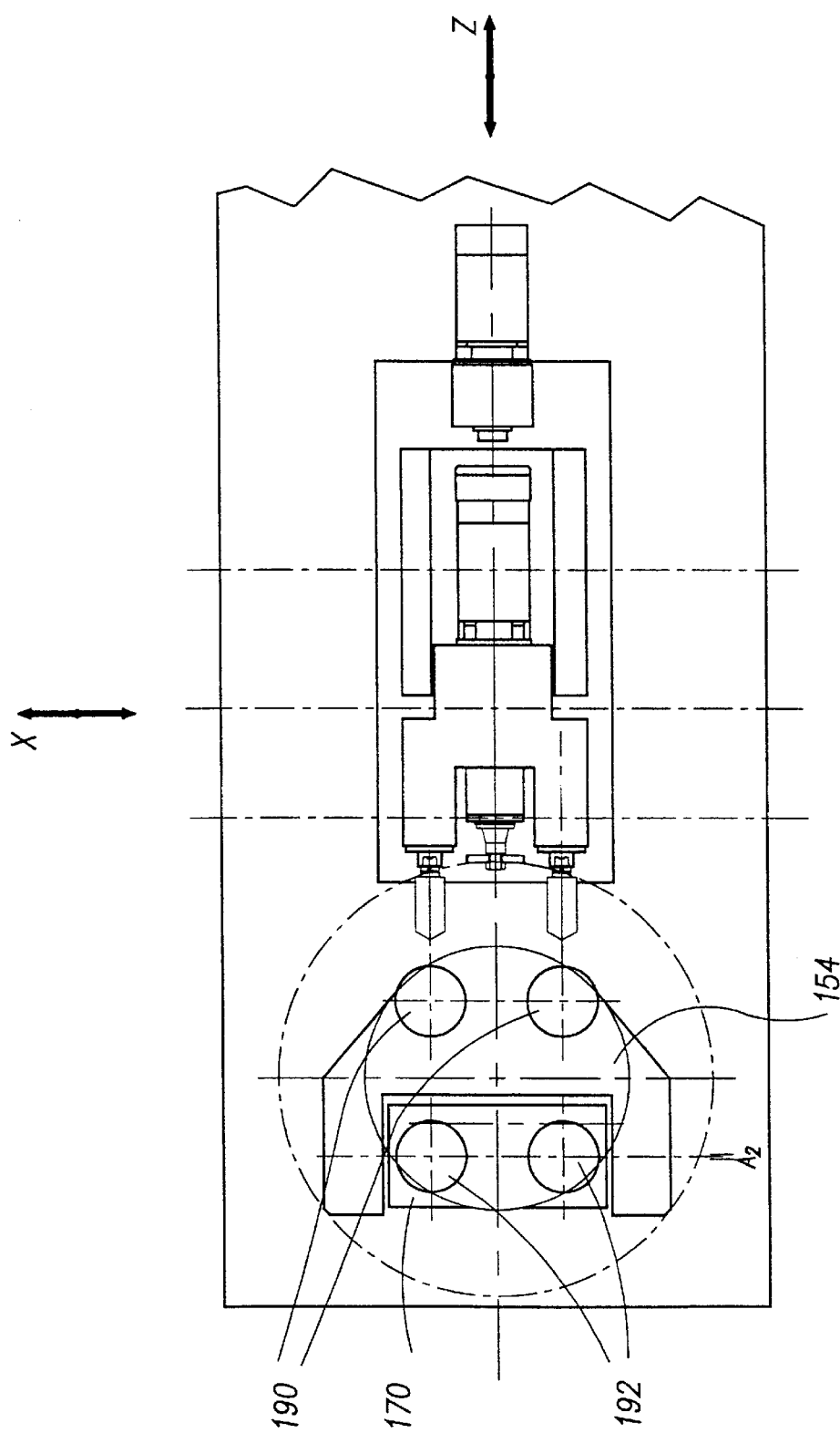
FIG. 12 is a plan view of the apparatus of FIG. 11.

FIG. 10 shows a preferred workpiece-retaining member for a single caliper block, and which is a part of cradle support 56. A reference template 76 is mounted on cradle 56, preferably designed according to EP 0 689 898. A caliper block 78 rests on template 76 and is locked by retaining members 80, 82, which are operated by hydraulic cylinders 84, 86. Cradle 56 comprises four workpiece-retaining members as described and as illustrated on FIG. 10.

Cradle 58 may also be provided with workpiece-retaining members similar to the one shown on FIG. 10, although the templates (as it may be seen on FIG. 8) should in this case be mounted on respective rotating platforms. However, since cradle 58 is intended for supporting workpieces that have already undergone a first cycle of heavy operations on cradle 56, it is generally preferable to use a conventional retaining device, where the references used are one or more of the surfaces that were machined in the first cycle of operations.

Cradles 56 and 58 could of course be designed to support only two workpieces, rather than four workpieces each.

Alternatively, according to a different implementation of the invention, spindle 46 is installed with an inclination to axis y by a small angle, typically less than 1°, so that it is capable of performing an inclined milling along surface 10 of a caliper block mounted on the device with horizontal cylinder, the feeding motion being obtained by interpolation of axes Z and Y.

In the operation of the apparatus as described above, while the machining head performs a set of operations on the workpieces supported on one of the cradles, say cradle 56, a workman 68 loads four workpieces on crdale 58, after unloading the workpieces that were machined previously. Unloading may be manual, or may be made by dropping the workpieces from the cradle while it points downward, to be subsequently overturned for loading. Device 54 is then tipped, and during tipping the cradle rotates typically by 180°, so that it will eventually place the workpieces in the proper position with respect to the machining head. Machining head 36 executes its work program on the workpieces, while the workpieces on cradle 56 are unloaded and replaced with other workpieces requiring machining.

The workpieces will typically undergo two machining cycles: in a first cycle, they are mounted on cradle 56, which lacks an axis B and on which the heavier operations are preferably performed, such as milling, boring or facing over wide surfaces; in a second cycle, they are mounted on cradle 58, where the availability of the two axes of rotation A and B allows the workpiece to be presented to the tools with arbitrary angles, in order to execute operations, usually less heavy, such as drilling, tapping, milling, profiling, etc. with practically arbitrary orientations.

The less stressful operations, such as drilling and tapping, will generally be performed by spindles 44, which are capable of working in parallel to perform the same operations simultaneously upon two side-by-side workpieces, provided that the machining head has been designed with a distance between spindles 44 that is equal to the distance between two adjacent (or alternate) workpiece retaining members.

The structure of the apparatus allows most motions and operations that are accessory to the actual machining to be overlapped. For instance, as far as the machining times are concerned, the cradle tipping operations around axes A1 and A2, as well as some of the rotations around axes B, might be masked by the tipping motion of drum 54 for cradle swapping. Also, loading and unloading the workpieces could take place with ease on one of the cradles during the machining operations of the spindles on the workpieces of the other cradle.

In a second preferred embodiment, shown on FIGS. 9 and 10, the machining head and the control members for its motion and for tool changing are substantially identical to the corresponding members in the first embodiment. However, the swapping device 54 is replaced by a turning table 154 with a vertical axis. Table 154 has a cradle 170 which is rotatable around a horizontal axis A2, similarly to cradle 58 of the first embodiment. The rotation arc of cradle 170 may extend over a full turn, but, alternatively, may be restricted to an arc of a few degrees.

Turning table 154 has a first pair of workpiece-retaining members 190, preferably of the kind shown on FIG. 10. In an opposite position, cradle 170 carries a second pair of workpiece-retaining members 192, also similar to FIG. 10, although they could be conventional. Workpiece-retaining members 192 are also capable of rotation around respective axes at right angles to the cradle tipping axis A2, for instance as described with reference to FIG. 8, or of another known type. If required, of course, workpiece-retaining members 190 could also be provided with similar rotation capability.

It will be understood that the second embodiment of the invention is capable of performing the same operations as the first, the operating positions being swapped by rotation of the table by 180°, and by using axes A2 and B similarly to the corresponding axes in the first embodiment.

Obviously, the preferred embodiments of the invention as described above are susceptible to modifications and changes, which are evident for the person skilled in the art. For instance, the structure driving the head might have a different design, according to any of the mechanisms known in the art, using one or more motors, and with or without clutch, while one or more of the axes of motion might be transferred to the workpiece-holding device, in a way to provide the same relative movements. The number of spindles on the head might also be different from the preferred embodiment shown and described above: for instance, the feed-out spindles might be two in number rather than one, while the milling spindle might also be duplicated in certain cases. These and other modifications should be regarded as falling within the scope of the invention.

What is claimed is:

1. Apparatus for machining motorcar disk brake caliper blocks and brackets, comprising a tool-holding machining head, drivable along a vertical axis and two horizontal axes with respect to a workpiece held on a workpiece-holding device, and a tool-changing magazine, wherein the machining head (36) has, at progressively lower levels along said vertical axis, at least one high-speed spindle (44), at least one low-speed spindle (46) and at least one feed-out spindle (48), all arranged substantially at right angles to said vertical axis and driven by one or more motors (42) mounted on the head;

the tool-changing magazine (52) is arranged for cooperating with said high-speed spindle for changing its tool by moving the machining head;

the workpiece-holding device (54; 154) is adapted to carry two sets of workpieces on respective supports (56, 58; 170), and to shift said supports in succession between a working position near the head and a work changing position remote from the head.

2. The apparatus of claim 1, wherein each of said sets of workpieces is mounted on a respective individual workpiece-retaining member (60, 62; 190, 192) carried by the respective support.

3. The apparatus of claim 1, wherein said sets of workpieces each comprise four workpieces.

4. The apparatus of claim 1, wherein said sets of workpieces each comprise two workpieces.

5. The apparatus of claim 1, wherein the tool-holding head comprises two of said high-speed spindles (44).

6. The apparatus of claim 1, wherein the tool-holding head comprises one of said low-speed spindles (46).

7. The apparatus of claim 1, wherein the tool-holding head comprises one of said feed-out spindles (48).

8. The apparatus of claim 1, wherein said at least one lowspeed spindles is inclined to the horizontal direction of at most 1°.

9. The apparatus of claim 1, wherein said high-speed spindles (44) project in a horizontal direction over said low-speed spindle (46) and feed-out spindle (48).

10. The apparatus of claim 1, wherein the tool-holding head (36) comprises a single driving motor (42) for rotation of all of said spindles.

11. The apparatus of claim 10, wherein said tool-holding head further comprises a feed-out actuator (43, 45) for said feed-out spindle (48).

12. The apparatus of claim 1, wherein said workpiece-holding device (54) is a swapping device for horizontal-axis tipping, which carries said supports (56, 58) on opposite sides of the tipping axis.

13. The apparatus of claim 12, wherein said supports are cradles (56, 58) arranged for tipping around respective axes which are parallel to the tipping axis of the swapping device.

14. The apparatus of claim 13, wherein at least one of said cradles carries individual workpiece-retaining members (60, 62) that are capable of moving around respective axes at right angles to the tipping axis of the cradle.

15. The apparatus of claim 2, wherein said workpiece-holding device is a vertical-axis rotating table (154).

16. The apparatus of claim 15, wherein said turning table carries said supports on its upper side.

17. The apparatus of claim 16, wherein the individual workpiece-retaining members (192) carried by a first of said workpiece-holding supports (170) are capable of a rotary motion around respective axes that are parallel to the table axis.

18. The apparatus of claim 17, wherein said first workpiece-holding support (170) is a cradle capable of turning around a horizontal axis at least through an arc of a few degrees, under control of said controllable motor means.

19. The apparatus of claim 17, wherein the individual workpiece-holders (190) carried by the second of said workpiece-holding supports are also capable of a rotary motion around respective axes parallel to the table axis.

* * * * *